United States Patent [19]

Nakajima

[11] Patent Number: 5,179,484

[45] Date of Patent: Jan. 12, 1993

[54] MECHANISM FOR ATTACHING AND DETACHING DISK CARTRIDGE FROM A DISK DRIVE

[75] Inventor: Yuji Nakajima, Hadano, Japan

[73] Assignee: Ricoh Company, Ltd., Tokyo, Japan

[21] Appl. No.: 598,237

[22] Filed: Oct. 16, 1990

[30] Foreign Application Priority Data

Oct. 25, 1989 [JP] Japan .................................. 1-275886

[51] Int. Cl.$^5$ ............................................ G11B 17/04
[52] U.S. Cl. ................................. 360/99.06; 360/99.02
[58] Field of Search .......................... 360/99.06, 99.02

[56] References Cited

U.S. PATENT DOCUMENTS 4,368,495  1/1983  Hamanaka et al. ............... 360/99.06
5,006,944  4/1991  Miyasaka ........................... 360/99.06

FOREIGN PATENT DOCUMENTS 0080162  5/1985  Japan .................................. 360/99.06

Primary Examiner—David J. Severin
Attorney, Agent, or Firm—Cooper & Dunham

[57] ABSTRACT

A mechanism for attaching and detaching a disk cartridge in a disk drive unit has a receiver for holding the disk cartridge having a disk for record and reproduction therein; a carrier having cam portions arranged on right-hand and left-hand sides of the receiver and engaged with rollers, the carrier being moved forward and backward to raise and lower the receiver; and inclination angle of the cam portions being small in a constructional portion thereof corresponding to a height of the rollers when the disk cartridge is separated from a magnet for attracting the disk at an ejecting time of the cartridge; the inclination angle of the cam portions being small in a constructional portion thereof corresponding to a height of the rollers when the disk cartridge is pressed against a guide pin at a loading time of the cartridge; and the inclination angle of the other constructional portions of the cam portions being large. The cam portions are arranged forward and backward on sides of the carrier. A constructional portion of a rear cam portion corresponding to the height of the rollers at the separating time of the disk cartridge from the disk attracting magnet at the ejecting time of the cartridge is set in a position higher than that of a constructional portion of a front cam portion corresponding to the height of the rollers.

4 Claims, 4 Drawing Sheets

MECHANISM FOR ATTACHING AND DETACHING DISK CARTRIDGE FROM A DISK DRIVE

BACKGROUND OF THE INVENTION

1. Field of the Invention

The present invention relates to a mechanism for attaching and detaching a disk cartridge in a disk drive unit.

2. Description of the Related Art

In a general mechanism for attaching and detaching a disk cartridge, cam portions for moving the disk cartridge therealong have a constant inclination angle such as 45°. In the case of ODD, the attractive force of a magnet for chucking a disk to a spindle is small. For example, the magnet can bear about 600 g in weight. Accordingly, force for ejecting the cartridge from the magnet is not strong so much even when the inclination angle of the cam portions is a large value such as 45°. For example, a weight about 2 Kg can be ejected by the ejecting force in this case. In contrast to this, in the case of HDD, the attractive force of a magnet is large. For example, the magnet can bear about 1400 g in weight. Accordingly, the ejecting force is strong in such a state so that operability is greatly reduced.

In the case of ODD, when the cartridge is pressed against a guide pin at the loading time of the cartridge, a load applied to the cartridge is composed of only the empty weight of the cartridge. Accordingly, there are no disadvantages that the cartridge is floated from the guide pin in such a state. However, in the case of HDD, the attractive force of the magnet is strong and the load at the loading time of the cartridge is large in comparison with that in the case of ODD since a hub seal, etc. are disposed in the attaching/detaching mechanism. Accordingly, in the case of HDD, the cartridge is floated from the guide pin.

SUMMARY OF THE INVENTION

It is therefore an object of the present invention to provide a mechanism for attaching and detaching a disk cartridge in which force for separating the disk cartridge from a magnet at an ejecting time of the disk cartridge and force for pressing the disk cartridge against the magnet at a loading time of the disk cartridge in the case of HDD are approximately equal to those in the case of ODD.

The above object of the present invention can be achieved by a mechanism for attaching and detaching a disk cartridge in a disk drive unit, the mechanism comprising a receiver for holding the disk cartridge having a disk for record and reproduction therein; a carrier having cam portions arranged on right-hand and left-hand sides of the receiver and engaged with rollers, the carrier being moved forward and backward to raise and lower the receiver; an inclination angle of the cam portions being small in a constructional portion thereof corresponding to a height of the rollers when the disk cartridge is removed from a magnet for attracting the disk at an ejecting time of the cartridge; the inclination angle of the cam portions being small in a constructional portion thereof corresponding to a height of the rollers when the disk cartridge is pressed against a guide pin at a loading time of the cartridge; and the inclination angle of the other constructional portions of the cam portions being large.

In accordance with the above structure, force for separating the cartridge from the magnet at the ejecting time of the cartridge in the case of HDD can be approximately set to that in the case of ODD. Further, cartridge pressing force at the loading time of the cartridge in the case of HDD can be approximately set to that in the case of ODD.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a mechanism for attaching and detaching a disk cartridge in the present invention will next be described in detail with reference to the accompanying drawings.

Figure 1:
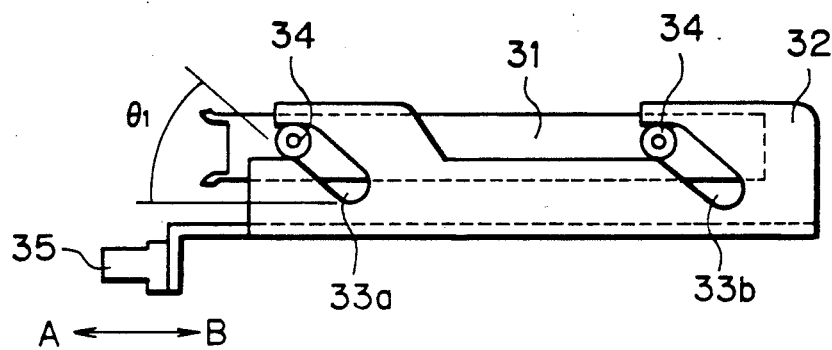
FIG. 1 is a view showing the construction of a general mechanism for attaching and detaching a disk cartridge.

A general mechanism for attaching and detaching a disk cartridge will be described with reference to FIG. 1 showing ODD having a size 5 (¼) inches. In FIG. 1, a disk cartridge having a disk for record and reproduction therein is inserted into a receiver 31 from an open front face thereof and the receiver 31 is held in this state. A carrier 32 has front and rear cam portions 32a and 33b on left-hand and right-hand sides thereof, respectively. The cam portions are respectively engaged with rollers 34 disposed on side faces of the receiver 31.

When the carrier 321 is moved in the direction of arrow A, the rollers 34 are moved along the cam portions 33a and 33b on a deep side of the carrier. Accordingly, the receiver 31 holding the cartridge is lowered and the cartridge is set in a predetermined position for recording and reproducing information. When the cartridge is taken out of the attaching/detaching mechanism, an operator pushes an ejecting knob 35 to move the carrier 32 in the direction of arrow B. Thus, the receiver 31 is raised and the cartridge can be taken out of the receiver 31.

In this example, the cam portions have a constant inclination angle $\theta_1$ such as 45°. In the case of ODD, the attractive force of a magnet for chucking the disk to a spindle is small. For example, the magnet can bear about 600 g in weight. Accordingly, force for ejecting the cartridge from the magnet is not strong so much even when the inclination angle $\theta_1$ of the cam portions is a large value such as 45°. For example, a weight about 2 Kg can be ejected by the ejecting force in this case. In contrast to this, in the case of HDD, the attractive force of a magnet is large. For example, the magnet can bear about 1400 g in weight. Accordingly, the ejecting force is strong in such a state so that operability is greatly reduced as follows.

Figure 2:
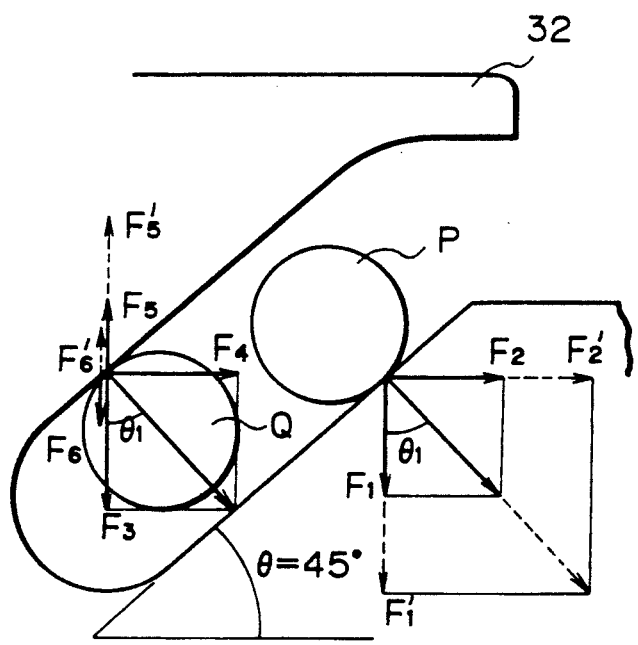
FIG. 2 is a view showing the shape and operation of a cam in the general attaching/detaching mechanism.

Namely, when the attractive force of the magnet is set to $F_1$ in FIG. 2, force $F_2$ for removing the cartridge from the magnet at an ejecting time of the cartridge is provided as follows.

$$F_2 = F_1 \cdot \tan\theta_1$$

Further, cartridge pressing force $F_6$ at a loading time of the cartridge is provided as follows, $$F_6 = F_3 - F_5 = (F_4/\tan\theta_1) - F_5$$

where the load of a carrier spring is set to $F_4$. Accordingly, as mentioned above, in the case of ODD, the ejecting force is not strong in such a state since the attractive force $F_1$ of the magnet is weak. When the cartridge is pressed against a guide pin at the loading time of the cartridge, a load $F_5$ is composed of only the empty weight of the cartridge. Accordingly, there are no disadvantages that the cartridge is floated from the guide pin in such a state. However, in the case of HDD, the attractive force $F_1$ of the magnet is strong and the load $F_5$ at the loading time of the cartridge is large in comparison with that in the case of ODD since a hub seal, etc. are disposed in the attaching/detaching mechanism. In the following description, it is assumed that the attractive force $F_1$ and the load $F_5$ in the case of HDD are twice those in the case of ODD. In this case, the above forces $F_2$ and $F_6$ are respectively changed to the following values.

$$F_2' = F_1' \cdot \tan\theta_1 = 2F_1 \cdot \tan\theta_1$$

$$F_6' = F_3 - F_5' = (F_4/\tan\theta_2) - 2 \cdot F_5$$

Accordingly, the ejecting force is doubled and the force $F_6'$ is set to a minus value when $(F_4/\tan\theta_2)$ is set to a value smaller than $2F_5$, thereby floating the cartridge from the guide pin.

Figure 3:
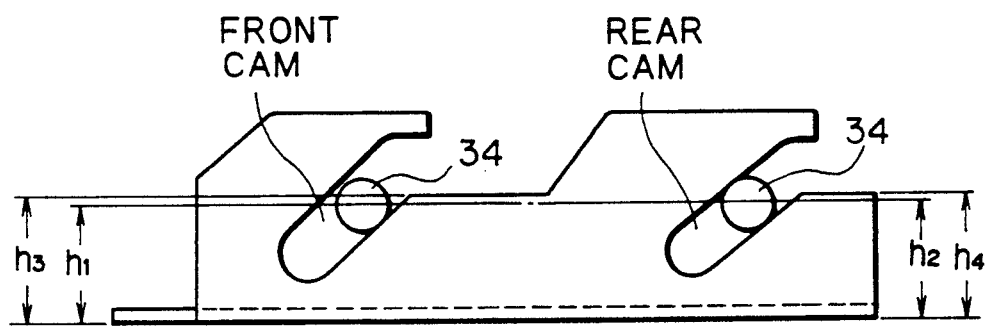
FIG. 3 is a view showing a side face of a carrier in the general attaching/detaching mechanism.
Figure 4:
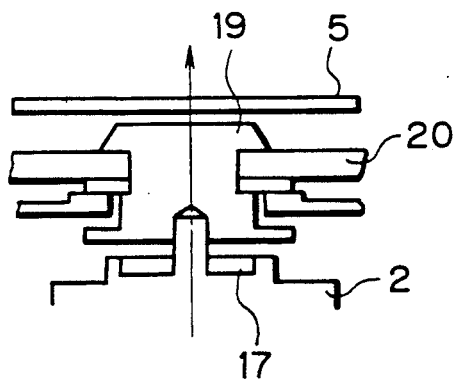
FIG. 4 is a view for explaining the operation of the general attaching/detaching mechanism.

In the general mechanism for attaching and detaching a disk cartridge shown in FIG. 3, cam portions have the same shape on front and rear sides thereof. Accordingly, front and rear heights $h_1$ and $h_2$ of receiver rollers 34 at the ejecting time of the cartridge are equal to each other. Accordingly, as shown in FIG. 4, when the cartridge is separated from a magnet, an armature 19 is lifted up straightly from the magnet 17 so that the attractive force of the magnet constitutes a load as it is.

Figure 5:
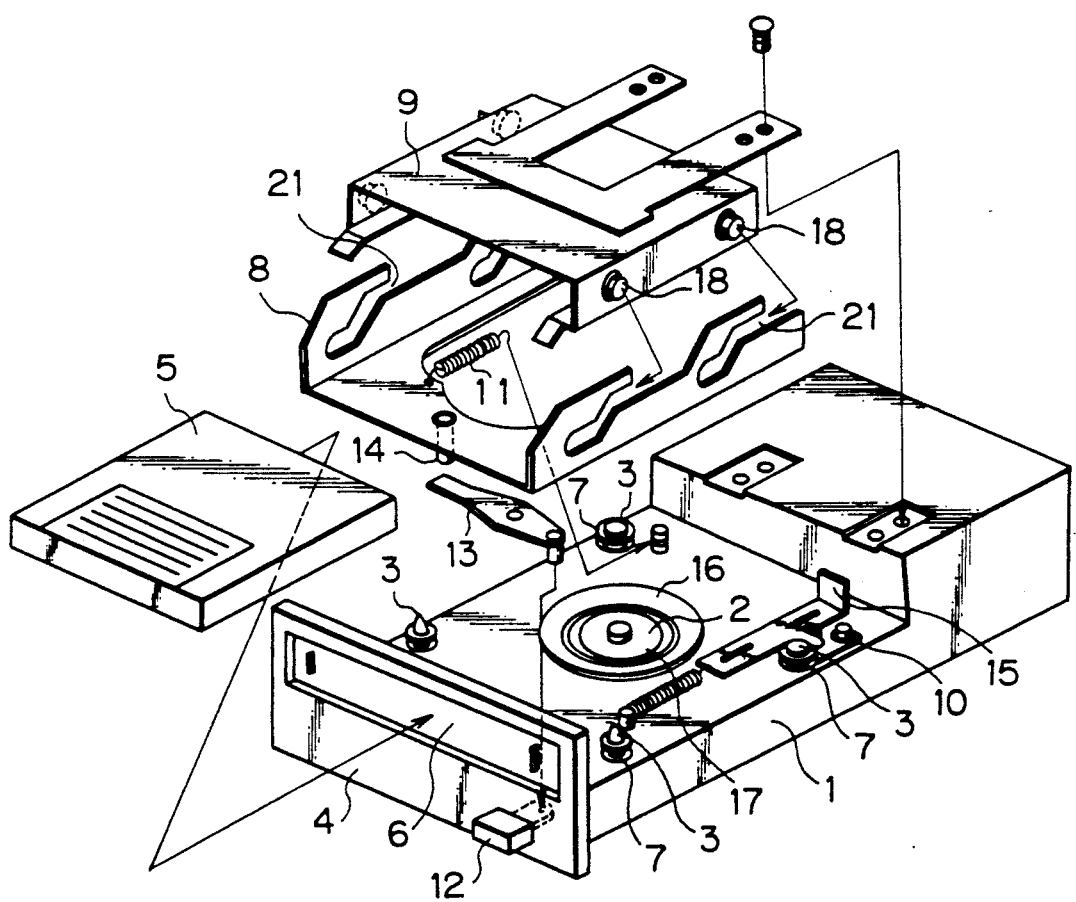
FIG. 5 is an exploded perspective view of a mechanism for attaching and detaching a disk cartridge in one embodiment of the present invention.

FIG. 5 shows a mechanism for attaching and detaching a disk cartridge in one embodiment of the present invention. In this figure, the attaching/detaching mechanism has a deck 1 in a disk drive unit, a spindle motor 2 for rotating a magnetic disk, guide pins 3 for positioning a cartridge 5, and a front bezel 4. The front bezel 4 has a window for inserting and taking out the cartridge 5 and a door 6 is attached to this window and can be opened and closed. A roller 7 having a grooves is coaxially attached to each of the cartridge positioning pins 3. The roller 7 is supported by each of the cartridge positioning pins 3 through a bearing. A carrier 8 can be moved forward and backward by an outside groove of the roller 7 as a guide. The carrier 8 is biased by a spring 11 backward at any time. Cam portions 21 are disposed on right-hand and left-hand sides of the carrier 8. The cam portions 21 are engaged with rollers 18 disposed on sides of a receiver 9 for holding the cartridge 5. The receiver 9 is raised or lowered as the carrier 8 is moved forward or backward.

Namely, when the cartridge 5 is attached to the deck, the cartridge 5 is inserted into the receiver 9 from the window of the front bezel 4. When the cartridge is inserted into the receiver 9 until a deepest position thereof, a carrier latch mechanism 10 is released and the carrier 8 is moved backward by resilient force of the spring 11, thereby lowering the receiver 9. Thus, the cartridge is lowered and moved onto the positioning pins 3. When the cartridge 5 is taken out of the deck, an operator pushes in an ejecting knob 12 so that an ejecting lever 13 is rotated and an end of the ejecting lever 13 pushes an ejecting pin 14 in the carrier 8 forward. Thus, the carrier 8 is moved forward so that the receiver 9 is raised. Simultaneously, the position of the carrier latch mechanism 10 is returned to an original position thereof and the cartridge 5 is pressed by an ejecting plate 15 so that the cartridge 5 is pushed out of the window of the front bezel 4.

The cartridge 5 is raised and lowered by the carrier 8 through the receiver 9 in a series of loading and ejecting operations mentioned above. At an ejecting time of the cartridge, i.e., at the raising time of the cartridge, a separating load from a magnet 17 is temporarily applied to the carrier 8 only in a raising operation of the cartridge. At a loading time of the cartridge, i.e., at the lowering time of the cartridge, only a final constructional portion of the cam portions is a constructional portion required to press the cartridge 5 against the positioning pins 3. In consideration of these points, in the present invention, the cam portions 21 in the carrier 8 have shapes shown in FIG. 6. Namely, the cam portions 21 have a small inclination angle in a constructional portion P thereof in which the rollers 18 are located at a point at which the cartridge 5 is separated from the magnet 17. Further, the cam portions 21 have a small inclination angle in a constructional portion Q thereof in which the rollers 18 are located at a point at which the cartridge 5 is pressed against the positioning pins 3 at the loading time of the cartridge. The cam portions 21 have a large inclination angle in the other constructional portions to which no load is applied.

Figure 7:
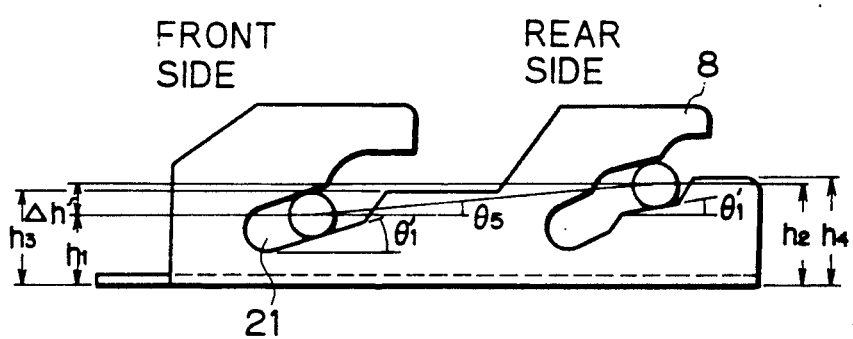
FIG. 7 is a view showing a side face of a carrier in which the heights of front and rear cams are different from each other.

As shown in FIG. 7, the height of the cam portions is set to $h_3$ on a front side thereof when the cartridge is completely ejected. The height of the cam portions is set to $h_4$ on a rear side thereof when the cartridge is completely ejected. The front height $h_3$ is set to be lower than the rear height $h_4$. The height of the receiver rollers is set to $h_1$ on a front side thereof and is set to $h_2$ on a rear side thereof when the cartridge is separated from the magnet is at the ejecting time of the cartridge. The front height $h_1$ is set to be lower by $\Delta h$ than the rear height $h_2$.

Figure 6:
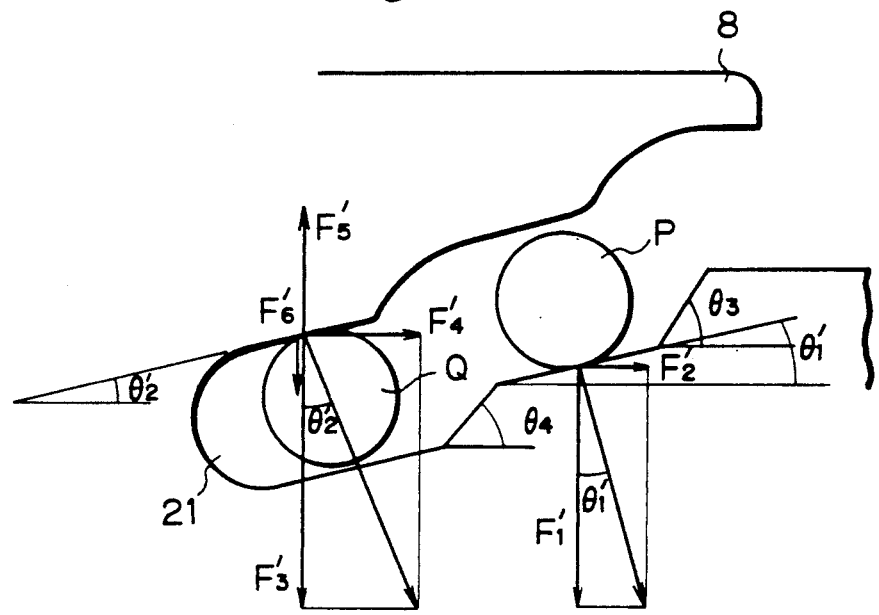
FIG. 6 is a view showing the shape and operation of a cam in the attaching/detaching mechanism in the present invention.

The operation of the attaching/detaching mechanism in the present invention will next be described with reference to FIG. 6. Reference numeral $\theta_1'$ designates an inclination angle of the cam portions 21 of the carrier 8 in the constructional portion P thereof in which the rollers 18 are located at a point at which the cartridge 5 is separated from the magnet 17. Further, reference numeral $\theta_2'$ designates an inclination angle of the cam portions 21 in the constructional portion Q thereof in which the rollers 18 are located at a point at which the cartridge 5 is pressed against the positioning pins 3 at the loading time of the cartridge. The inclination angle $\theta_1'$ and $\theta_2'$ are set to be small. Inclination angles $\theta_3$ and $\theta_4$ of the other constructional portions of the cam portions 21 are set to be arbitrarily large.

In the case of HDD, when attractive force $F_1'$ of the magnet is twice that in the case of ODD, ejecting force $F_2'$ is provided as follows.

$$F_2' = F_1' \cdot \tan\theta_1' = 2F_1 \cdot \tan\theta_1'$$

If the inclination angle $\theta_1'$ is set to satisfy the following equation, $$\tan\theta_1' = \tan\theta_1/2$$

the ejecting force $F_2' = F_2$ is formed so that the ejecting force in the case of HDD can be set to that in the case of ODD. For example, when $\theta_1 = 45°$ is set, the following formula is provided.

$$\theta_1' = \tan^{-1}(\tan 45°/2) = 26.6°$$

Similarly, when a load $F_5'$ at the loading time of the cartridge is twice that in the case of ODD, cartridge pressing force $F_6'$ is provided as follows.

$$\begin{aligned}F_6' &= (F_4'/\tan\theta_2') - F_5' \\ &= (F_4'/\tan\theta_2') - 2 \cdot F_5\end{aligned}$$

If the inclination angle $\theta_2'$ is set to satisfy the following formula:

$$F_4'/\tan\theta_2' = (F_4/\tan\theta_1) + F_5$$

$F_6' = F_6$ is formed so that the cartridge pressing force in the case of HDD can be set to that in the case of ODD. For example, when $\theta_1 = 45°$ and $F_4 = F_5$ are set, the following formula is provided.

$$\theta_2' = \tan^{-1}(\tan 45°/2) = 26.6°$$

Figure 8:
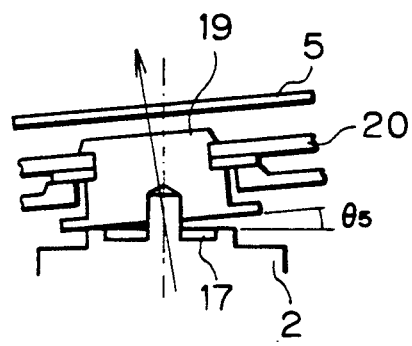
FIG. 8 is a view showing the operations of the carrier caused by the difference in height between the front and rear cams.

In FIG. 7, the attaching/detaching mechanism is operated as follows by providing the difference $\Delta h$ between the front and rear heights of the receiver rollers when the cartridge is separated from the magnet at the ejecting time of the cartridge. In the general mechanism for attaching and detaching a disk cartridge shown in FIG. 3, as mentioned above, cam portions have the same shape on front and rear sides thereof. Accordingly, front and rear heights $h_1$ and $h_2$ of receiver rollers at the ejecting time of the cartridge are equal to each other. Accordingly, as shown in FIG. 4, when the cartridge is separated from a magnet, the armature 19 is lifted up straightly from the magnet 17 so that attractive force of the magnet constitutes a load as it is. In contrast to this, in the present invention, as shown in FIG. 8, when the armature 19 is separated from the magnet 17, the armature 19 is lifted up by force inclined by inclination angle $\theta_5$ since the above difference $\Delta h$ in height is formed. Accordingly, it is possible to separate the armature 19 from the magnet 17 by force weaker than the attractive force of the magnet.

As mentioned above, in accordance with the present invention, force for separating the cartridge from the magnet at the ejecting time of the cartridge in the case of HDD can be approximately set to that in the case of ODD. Further, cartridge pressing force at the loading time of the cartridge in the case of HDD can be approximately set to that in the case of ODD. Furthermore, it is possible to separate the cartridge from the magnet by force weaker than attractive force of the magnet.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mechanism for attaching and detaching a disk cartridge in a disk drive unit, said disk cartridge enclosing a disk on which information can be recorded and from which information can be reproduced, said mechanism comprising:
    a receiver for holding said disk cartridge therein;
    a plurality of roller attached to said receiver; and
    a carrier having a right-hand side and a left-hand side, each side of said carrier having a plurality of cam portions, said plurality of cam portions engaging with said rollers, said carrier being moved forward and backward to thereby raise and lower said receiver, each of said plurality of cam portions including at least a first portion, a second portion and a third portion,
    each of said first portions engaging with said rollers when said disk cartridge is removed from a magnet for attracting the disk at a time of ejecting said disk cartridge, said first portion having a first inclination angle with respect to a horizontal direction,
    each of said second portions engaging with said rollers when said disk cartridge is pressed against a guide pin at a time said disk cartridge is loaded, said second portion having a second inclination angle with respect to the horizontal direction, and
    each of said third portions having a third inclination angle with respect to the horizontal direction, said third inclination angle being greater than the first or second inclination angles.

2. A mechanism according to claim 1, wherein said disk cartridge is removed from said magnet by exerting thereon a force weaker than attractive force of said magnet.

3. A mechanism according to claim 1, wherein said cam portions comprise a front cam portion which is at a forward part of each of the right-hand and left-hand of sides of said carrier and a rear cam portion which is at a rear part of each of the right-hand and left-hand of sides of said carrier.
    said rear cam portion being arranged at a rear height from a bottom of said carrier, one of said rollers engaging with said rear cam portion at the rear height when said disk cartridge is removed from a magnet for attracting the disk at a time of ejecting said disk cartridge,
    said front cam portion being arranged at a front height from a bottom of said carrier, one of said rollers engaging with said front cam portion at the front height when said disk cartridge is removed from a magnet for attracting the disk at an ejecting time of said disk cartridge, the rear height being set higher than the front height.

4. A mechanism according to claim 3, wherein said disk cartridge is removed from said magnet by exerting thereon a force weaker than attractive force of said magnet.

* * * * *